United States Patent [19]

Oliver, Jr. et al.

[11] 4,352,739
[45] Oct. 5, 1982

[54] COMPLETION AND WORKOVER FLUID FILTRATION SYSTEM

[76] Inventors: John E. Oliver, Jr., 3752 Del Monte Dr., Houston, Tex. 77019; W. Gerald Lott, 1857 Post Oak Park Dr., Houston, Tex. 77056

[21] Appl. No.: 262,177

[22] Filed: May 11, 1981

Related U.S. Application Data

[63] Continuation of Ser. No. 113,789, Jan. 21, 1980, abandoned.

[51] Int. Cl.³ .......................................... B01D 29/38
[52] U.S. Cl. .................................. 210/739; 210/769; 210/791; 210/108; 210/167; 210/333.1
[58] Field of Search ............... 210/805, 806, 741, 769, 210/788, 791, 108, 167, 333.1, 333.01, 739; 55/96, 97, 284, 315, 338, 350, 419

[56] References Cited

U.S. PATENT DOCUMENTS

| | | | |
|---|---|---|---|
| 2,237,603 | 8/1941 | Kapp | 210/333.1 |
| 3,212,237 | 10/1965 | Wright | 55/96 |
| 3,265,212 | 8/1966 | Bonsall, Jr. | 210/167 |
| 3,345,288 | 10/1967 | Sontheimer | 210/806 |
| 3,692,178 | 9/1972 | Reece | 210/333.1 |
| 3,737,037 | 6/1973 | Bone | 210/806 |
| 3,860,019 | 1/1975 | Teague | 210/167 X |
| 4,162,973 | 7/1979 | Lynch | 210/333.1 |

Primary Examiner—John Adee
Attorney, Agent, or Firm—Guy E. Matthews

[57] ABSTRACT

A liquid cleaning system for liquid that is substantially continuously circulated and which becomes contaminated with solid particulate and debris during circulation. The liquid cleaning system, which is particularly advantageous to cleaning liquid that is circulated within a petroleum well bore during completion and workover activities, incorporates a vibratory screen separator for accomplishing preliminary separation of large particulate and debris from the contaminated liquid and which also incorporates a filtration bank having a plurality of filters that are each interconnected with inlet discharge and drain headers. Filter bank incorporates a valving system having the capability of accomplishing backflushing by circulating clean fluid in reverse manner through selected ones of the filters to remove collected solid particulate therefrom and transport the removed particulate to the drain header. The drain header is interconnected with a centrifugal solids separation system that separates a majority of the solid particulate material from the backflushing fluid and transports the backflushing fluid back through the filter bank for cleaning thereof. The filter bank is designed for selective backflushing of individual filters thereof while at the same time maintaining continuous filtering activities by means of other filters in order that the liquid circulation system may function in continuous manner without necessitating any downtime for restoration of the filtration system.

19 Claims, 6 Drawing Figures

COMPLETION AND WORKOVER FLUID FILTRATION SYSTEM

This is a continuation of application Ser. No. 113,789 filed Jan. 21, 1980, now abandoned.

FIELD OF THE INVENTION

This invention relates generally to the filtration of solid particulate from circulating liquid and, more particularly, relates to a system for allowing substantially continuous circulation of liquid material for commercial activities, such as cleaning, wherein particulate separation filters are selectively restored while other filters of a filtation bank conduct continuous filtering of solid particulate from the liquid and thus maintain the commercial cleaning effectiveness of the filtration system, enabling substantially continuous filtration and circulation of cleaning fluid over long periods of time without necessitating any down time for restoration of the filtration system.

BACKGROUND OF THE INVENTION

The selection of any filtration equipment for the purpose of providing continuous cleaning for circulating liquid is the result of many considerations. Obviously, the filtration system must accomplish removal of undesirable elements from a liquid flow stream even though the undesirable elements may vary widely with regard to the particular type of filtration system that might be designed for separation of the same from a carrier fluid. For example, the removal of bacteria or other microorganisms may require the use of sophisticated sanitary filters while the removal of unwanted odors or liquid turbidity may call for the use of depth filtration, through layers of sand, charcoal or diatomaceous earth, in which the passages grow increasingly more restrictive. Many filter applications, however, are concerned only with the separation of specific solids from a liquid stream. This kind of application is frequently accomplished with surface-type filters utilizing fibrous cartridges or mesh screens composed of either woven wire or fabric material. This category includes filters having the primary capability of removing solid particulate from oil and gas well completion fluids as well as circulating fluids employed in other commercial activities. While the present invention is discussed herein particularly with regard to the relation thereof to wells that are capable of producing petroleum products, it is not intended to limit the invention to the clening of liquids that are ordinarily employed for completion and workover activities in conjunction with deep wells of this nature. It is intended within the scope of the present invention to provide a liquid cleaning system that may be effectively employed in conjunction with a wide range of commercial activities. For purposes of simplicity, however, the invention is described herein particularly as it relates to the cleaning of liquid that is employed during completion and workover activites in connection with deep wells capable of producing petroleum products.

As is the case with most types of equipment, the choice of filtration equipment is a process of evaluating alternatives. Overall costs must be weighted, and the effect of the filtration system on the particular production involved must also be given careful consideration. In the case of filtration systems, it is important to consider whether the filtration medium can be maintained or regenerated in order to provide for continuous or substantially continuous commercial liquid circulation activities without shutting down the commercial system in order for the filtration system to be restored to the commercially effective quality thereof.

With regard to liquid filtration systems, the liquid filters fall into three general categories including replaceable filters, filters that may be manually or mechanically cleaned and filters that may be restored to operative quality by means of backwashing. With regard to replaceable filters, no effort is typically made to clean or regenerate the filtering media. Instead, the filter is typically in the form of a cartridge that may be removed from the liquid circulation system and disposed of and with regeneration of the filter system taking the form of clean cartridges being inserted in the place of the cartridges that are removed for disposal. Typical examples of this media include disposable cartridge filters, bag filters, pad filters and the like. Among these, the cartridge filter is probably the most commonly used. These filters may offer a lower installed cost, and are generally utilized in low flow applications with relatively clean liquids. However, the frequency of replacement can present a prohibitive operating cost to utilization of cartridge filters. Other disadvantages may include excessive labor costs, down time of the liquid processing system, bypassing of fluid around the cartridge due to seal failure, and transportation, storage and disposal of spent filter cartridges. The most significant of these disadvantages is down time of the commercial activity that requires circulation of the liquid that is contaminated and is required to be cleaned during continuous circulation. In the case of oil and gas wells in particular, shutting down the liquid circulation process during completion and workover activities can result in extremely expensive costs, especially in the case of offshore wells which require extremely expensive personnel and equipment for conducting such activities.

In the case of manual or mechanical cleaning of filters, most filters that are employed are of relatively expensive construction and require high labor costs in order to achieve removal and restoration of the filters and for accomplishing removal of the solid particulate from the filters themselves. Mechanical cleaning of filters often results in high maintenance costs due to the necessary close tolerance of moving parts that are required.

Backwashing systems for removal of accumulated solid particulate from liquid filters involve a reversal of liquid flow through the medium. This process is common to sand and in-line pressure filters. Backwashing sand filters require large volumes of liquid at low flow rates to prevent the breakup of the sand bed, which must be replaced periodically.

Tubular pressure filters are backwashed quickly and in place with a minimum loss of liquid. Where tubular pressure filters are utilized for separating solid paticulate from a circulating fluid medium, it is typical for the fluid circulation system to be shut down periodically in order to allow the filters to be backwashed. It is desirable to provide a backwashing system that enables the liquid circulation system to be maintained in continuous operation and yet allows the tubular filter to be cleaned as often as is appropriate to obtaining optimum filtering characteristics.

During typical filter backwashing operations, a volume of liquid matter is typically lost since the liquid material itself it utilized to transport the accumulated solid particulate to a suitable receptable for disposal. In many cases, especially in conjunction with completion and workover operations in oilwells, the liquid medium, which is typically a brine, is of quite expensive nature. It is desirable, therefore, to provide a liquid backflushing system for accomplishing removal of accumulated particulate from tube or cartridge type filters and further to provide means for recovery of substantially all of the liquid that is employed in the backflushing operation for subsequent reuse.

In view of the foregoing, it is a primary feature of the present invention to provide a novel liquid filtration system allowing continuously circulating fluid to be continuously cleaned of solid particulate and enabling the filters of the filtration system to be restored by backflushing operations without requiring the liquid circulation system to be shut down.

It is another feature of the present invention to provide a novel liquid filtration system whereby liquid utilized for filter backflushing operations is recovered and is fed back into the liquid cleaning system, thereby minimizing any loss of fluid during the fluid cleaning operation.

It is another feature of this invention to provide another novel liquid filtration system for continuously circulating liquid whereby the contaminated liquid is subjected to preliminary mechanical separation to remove large particulate and debris from the contaminated liquid and is then subjected to filtration by means of a filter bank in order to remove all solid particulate above a predetermined size from the contaminated liquid.

It is an even further feature of this invention to provide a novel fluid filtration system for continuously circulating liquid, wherein liquid utilized for backflushing the filter system and transporting accumulated solid particulate therefrom is subjected to centrifugal separation for removal of a majority of the solid particulate from the backflushing liquid and wherein the cleaned backflushing liquid is then recirculated through the filtration system for recleaning and subsequent use.

Other and further objects, advantages and features of the present invention will become apparent to one skilled in the art upon consideration of this entire diclosure. The form of the invention, which will now be described in detail, illustrates the general principles of the invention, but it is to be understood that this detailed description is not to be taken as limiting the scope of the present invention. For example, although the present invention is described principally as it relates to utilization in conjunction with circulation system for completion and workover of deep wells for producing petroleum products, it is intended that the invention be applicable to other continuous liquid circulation systems as well.

SUMMARY OF THE INVENTION

In accordace with the present invention, contaminated liquid in a substantially continuous flowing liquid circulation system is conducted to vibratory screen separation apparatus where large particulate and debris are separated from the contaminated liquid. The discharge of vibratory screen separator is conducted to a holding vessel or tank having an outlet that is connected with the suction of a liquid pump. The discharge of the liquid pump is communicated to the inlet of a primary filtration bank incorporating a plurality of tube type filters that are capable of having the filtration capability thereof restored by backflushing operations. The discharge of the liquid filtration bank is identified as clean liquid, having all of the particulate in the size range of 20-40 microns and larger removed therefrom. The clean fluid discharge of the primary filtration bank is conducted to the liquid circulation system for reuse.

Each of the plurality of filters of the primary filter bank is disposed in communication with inlet, discharge and drain headers and each of the individual filters is provided with control valves that allow the filters to be individually cleaned by backflushing operations while the remaining filters function to provide continuous cleaning of the contaminated fluid during circulation thereof through the filtration bank. Valve selection and control means is provided that causes operation of the control valves responsive to the development of a predetermined pressure differential across any one of the plurality of filters, which predetermined pressure differential the filter to be sufficiently blocked, that cleaning thereof is desirable. Each of the filters employs two control valves that are simultaneously positionable at a filtering position, allowing flow of liquid from the inlet header through the filter and to the discharge header. The control valves are capable of being shifted to a backflushing position whereby communication between the inlet header and the filter is blocked and cleaned liquid is allowed to flow from the discharge header through the filter in reverse manner and to the drain header. During this reversed flow of liquid through the filter, accumulated solid particulate on the filter tube is separated from the filter and is transported with the flowing backflushing liquid to the drain header. To the drain header is connected the inlet of a centrifugal separator having the capability of separating the solid particulate from the backflushing liquid and providing a discharge of solid particulate along with a small quantity of backflushing fluid and another discharge of substantially clean liquid. This substantially clean liquid is conducted to the liquid holding tank and is subsequently pumped back through the primary filter tank in order to accomplish sufficient cleaning for use of this liquid in the liquid circulation system.

In the case of completion and workover operations for deep wells capable of producing petroleum products, first, second and third settling tanks, or any surface fluid treatment arrangement, are employed in the same manner as typically employed in well drilling, completion and workover activities. In many cases, contaminated liquid enters the first settling tank by means of a well discharge conduit and then flows to a second settling tank by means of a connection conduit therebetween. Another connection conduit interconnects a third settling tank with the second settling tank and the third settling tank is utilized as a supply vessel for cleaned liquid for circulating into the well bore. In the case of the present invention, the liquid connection between the settling tanks are provided with valve control and contaminated circulation liquid is removed from the first settling tank and pumped to the vibratory screen separator for preliminary separation. Liquid from the second settling tank, which is relatively clean of large particulate and debris due to settling, may be pumped directly to the liquid holding tank for subsequent introduction into the primary filter bank for cleaning.

BRIEF DESCRIPTION OF THE DRAWINGS

The above and other objects and novel features of the instant invention will be readily apparent from the following description taken in conjunction with the accompanying drawings. It is to be expressly understood that the drawings are provided for the purpose of illustration only, and are not intended to define the limits of the invention, but rather merely illustrate preferred embodiments and structures incorporating features of the instant invention.

In the accompanying drawings forming a part of this specification and wherein like reference numerals are employed to designate like parts.

DETAILED DESCRIPTION OF PREFERRED EMBODIMENT

Figure 1:
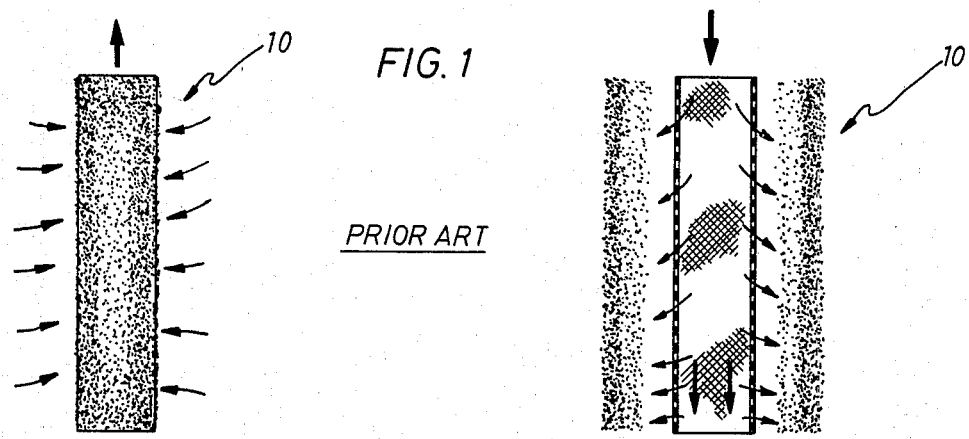
FIG. 1 is a composite view of a tube type solid particulate separation filter with accumulated solid particulate that is loaded or blinded with accumulated solid particulate. At the right side portion of FIG. 1, the filter is shown during backflushing thereof.

Referring now to the drawings and first to FIG. 1, there is shown a typical tube type filter 10 at the left portion of the figure, which filter has become loaded or blinded with accumulation of solid particulate on the exterior thereof. The direction of liquid flow is identified by small arrows at the sides or cylindrical periphery of the filter and cleaned fluid is discharged at one extremity thereof as shown by the uppermost flow arrow. As shown at the right side portion of FIG. 1, backflushing liquid is introduced into the filter 10 as shown by the reversed flow arrow at the upper portion of the figure and this backflushing liquid causes removal of a majority of the accumulated solid particulate in the manner illustrated pictorially. The separated solid particulate may then be conducted to a suitable handling or disposal facility, after which, the flow of liquid may be reversed as shown at the left side portion of the figure and liquid filtering operations may be continued.

Figure 2:
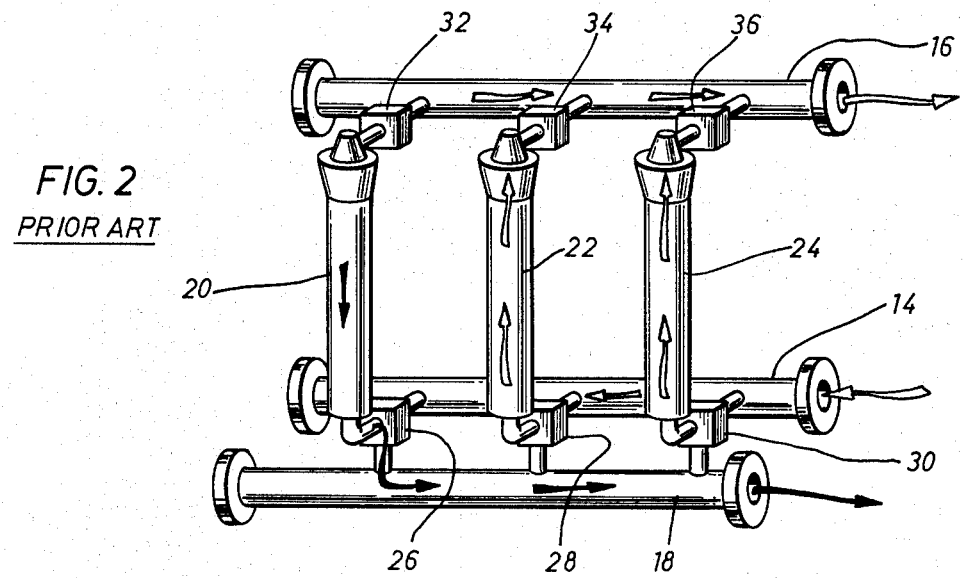
FIG. 2 is an isometric view of a filter bank incorporating inlet discharge and drain headers with three valve controlled filters interconnected therewith and with one of the filters being backflushed while the remaining filters continue liquid cleaning operations.

With reference now to FIG. 2, a liquid filtration bank is illustrated generally at 12 having filter elements that are capable of being cleaned by means of backflushing as shown in FIG. 1. The liquid filtration bank 12 incorporates an inlet header 14, a discharge header 16 and a drain header 18. Three filter elements are shown at 20, 22 and 24 with each of the filters being connected in parallel to the common inlet, outlet and drain headers. The lower portion of each of the filters is selectively connected to the inlet header 14 or the drain header 18 by means of three-way control valves, such as shown at 26, 28 and 30, while the upper extremities of each of the filters are simply interconnected with the discharge conduit 16. Valve elements 32, 34 and 36 are provided in the event it should become desirable to disassemble any one of the filters for servicing or replacement of a filter tube thereof. The remaining filters may be maintained in continuous operation during servicing of one of the filters.

As shown at the left-hand portion of FIG. 2, filter 20 is being backflushed since valve 26 is positioned to block communication between the lower portion of the filter and the inlet header, and opens communication between the lower portion of the filter and the drain header. A portion of the filter liquid, or filtrate, is redirected from normal flow during filtration and is used as the backwashing medium. Since no outside liquid is utilized for backwashing, the system is typically referred to as an internal backwashing system. The backwashing cycle is initiated by a simple 90° rotation of the three-way ball valve 26 at the inlet of the filter element 20 to be cleaned. This simultaneously closes the filter element to the inlet header and opens it to the drain. A portion of the filtrate from the elements remaining on stream and under pressure then surges in reverse through the screen, backwashing solid particulate from the filter 20 to the drain. This process is repeated with each element in sequence while continuous cleaning of the circulating liquid is handled by the filter elements remaining on stream. Internal filtration systems are typically employed under circumstances where the liquid is sufficiently free-flowing; where the value of the liquid is not prohibitive; and where the system can be designed with proper flow and pressure characteristics.

A liquid filtration bank essentially as identified in FIG. 2 may be obtained commercially from Ronningen-Petter Division of the Dover corporation, P.O. Box 188, Portage, Mich. 49081.

Figure 3:
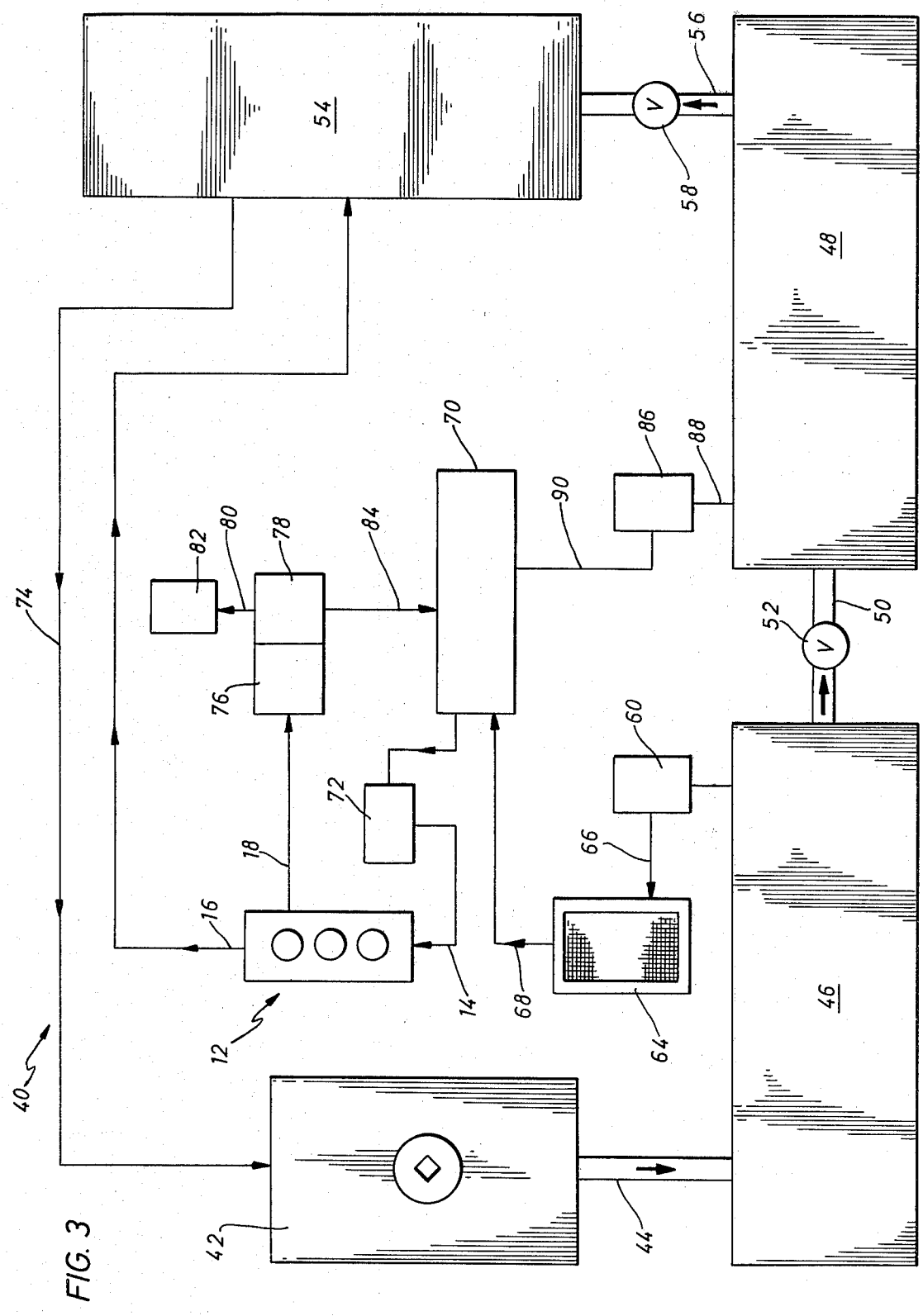
FIG. 3 is a schematic illustration of a liquid cleaning system constructed in accordance with the present invention and adapted to clean fluid that is circulated through a well bore during completion and workover activities.

Under circumstances where sea water or ordinary water is utilized as the circulating liquid medium, the back-flushing liquid with the solid particulate transported thereby may be simply discharged as waste material. Under circumstances where the circulating liquid medium is a brine of specific chemical makeup, it is desirable to recover as much of the backflushing liquid as is possible while assuring adequate removal of solid particulate material from the circulating liquid. With reference now particularly to FIG. 3, the present invention is directed to a liquid cleaning system whereby provision is made for recovery of all but a minimal quantity of the backflushing liquid. As shown in FIG. 3, a liquid circulation system is identified schematically generally at 40 wherein a drilling rig 42 includes a discharge conduit 44 that conducts contaminated circulation fluid frm the well bore to a first settling tank 46. The first settling tank is connected in series with a second settling tank by means of a connection conduit 50 having a valve 52 that is provided to control communication between settling tanks 46 and 48. A third settling tank 54 is connected in series with the second settling tank 48 by means of a connection conduit 56 with a valve 58 being provided to control communication of liquid between the second and third settling tanks. The first, second and third settling tanks are typically employed in most well drilling completion and workover systems although connection conduits between the settling tanks are not typically provided with valved control.

A centrifugal pump 60 is provided having the suction conduit 62 thereof in communication with the first settling tank, allowing contaminated liquid to be withdrawn from the first settling tank or directly from the well flowline and pumped to a vibratory screen separator 64 by means of the discharge conduit 66 of the pump. The vibratory screen separator 64 accomplishes preliminary separation of large particulate and debris from the contaminated circulating liquid and the discharge conduit 68 of the separator 64 is in communication with a holding tank 70 that serves as a supply tank for the bank of solid separator filters. A centrifugal pump 72 is provided having its suction in connection with the holding tank 70 and with its discharge in communication with the inlet header 14 of the filter bank 12. The filter bank 12 is in the form illustrated generally at 12 in FIG. 2. The discharge header 16 is interconnected with the third settling tank 54 which serves as a supply vessel for cleaned liquid that is to be circulated into the well bore by means of the liquid supply conduit 74.

To the drain header 18 of the filter bank 12 is interconnected a baffled tank 76 with a centrifugal separator 78 being in fluid receiving communication with the baffled tank, the centrifugal separator provides a discharge 80 of solid particulate along with a small quantity of backwashing liquid which is transported to a suitable disposal container 82 for ultimate disposal as desired. The centrifugal separator 78 also provides a discharge 84 of partially cleaned backwashing fluid with discharge 84 being conducted to the holding tank 70 for recirculation through the filtration bank 12. Another centrifugal pump 86 is provided having the suction conduit 88 thereof interconnected with the second settling tank 48 and with the discharge conduit 90 thereof in communication with the holding tank 70. Thus, partially settled but yet possibly contaminated circulating liquid may be removed from the second settling tank by means of the centrifugal pump 86 and subjected to filtration, if desired. In the event the liquid present within the second settling tank is sufficiently clean for circulation into the well bore, the valve 58 may simply be opened, thereby allowing flow of liquid from the second settling tank to the third settling tank 54.

Through employment of a liquid cleaning system such as illustrated in FIG. 3, the only liquid that is lost during particulate separation from the liquid is a small quantity of liquid that is discharged from the centrifugal separator 78 through conduit 80 to the disposal receptacle 82. The loss of liquid is minimal and therefore the expense of the liquid filtration process is minimized. Moreover, circulation of liquid into the well bore is allowed to remain substantially continuous for long periods of time and yet particulate separation from the contaminated liquid being discharged from the well bore is allowed to remain efficient at all times by the filter backflushing system.

Figure 4:
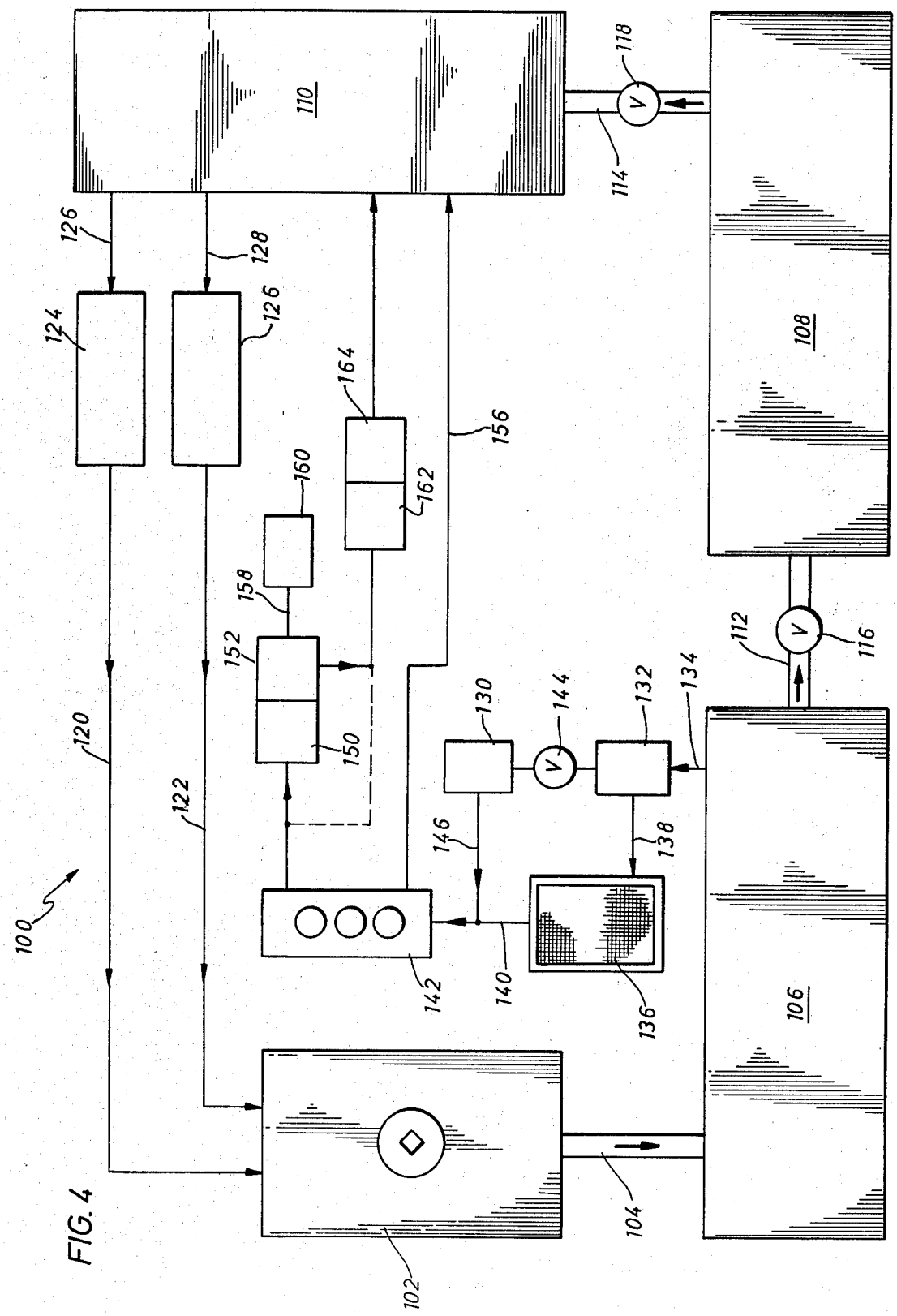
FIG. 4 is a schematic illustration of an alternative liquid cleaning system for continuously flowing fluid that is circulated into a well bore during completion and workover activities.

Referring now to FIG. 4, a modified embodiment of the present invention is illustrated in schematic form generally at 100 wherein a drilling or workover rig is shown at 102 having a discharge flow line 104 that conducts contaminated liquid flowing from the well bore to a first settling tank 106. Second and third settling tanks 108 and 110 are connected in series by means of connection conduits 112 and 114 and communication between the settling tanks is controlled by means of valves 116 and 118. The liquid circulation system for completion or workover activities incorporates a pair of liquid delivery lines 120 and 122 each incorporating rig pumps 124 and 126 with the suction lines 126 and 128 thereof being in communication with the third settling tank 110 in order to supply clean liquid for the liquid circulation system. Since it is desirable to accomplish cleaning of the contaminated liquid flowing from the discharge flow line 104 of the rig into the first settling tank 106, a pair of centrifugal pumps 130 and 132 are interconnected with a common suction line 134 that is open to an outlet of the first settling tank. If desired, the suction line 104 may simply be a flexible hose extending into the first settling tank thereby simplifying installation of the liquid cleaning system without requiring any modification of the settling tank system of the drilling rig. A vibratory screen separator 136 is provided having its inlet interconnected with the discharge 138 of the pump 132 and being operative to induce screen separation of large particulate and debris that is present in the liquid being pumped and centrifugal pump 132. A partially clean discharge of the vibratory screen separaotr is conducted via discharge conduit 140 to an automatic primary filter bank 142 having the capability of continuous automatic operation and automatic filter regeneration in the manner described above. In the event the liquid in the first settling tank 106 contains sufficiently small particulate that the vibratory screen separator is not required, a valve 144 in the suction conduit 134 may be opened and centrifugal pump 130 may be energized to bypass the vibratory screen separator and conduct and contaminated liquid directly from the first settling tank to the filter bank 142 by means of a bypass conduit 146.

During backflushing restoration of the filters in the filter bank, a drain header 148 transports particulate and backwashing liquid from the filter being regenerated to a liquid recovery unit incorporating a baffled vertical tank 150 that accomplishes separation of some of the particulate from the backwashing liquid by means of settling. A centrifugal separator 152 is interconnected with the discharge of the baffled settling tank 150 and the liquid received thereby is separated from the particulate by centrifugal activity with the cleaned liquid being transported through a recovery discharge line 154 to the third settling tank or suction tank 110. Clean fluid discharge of the primary filter bank 142 is transported by means of a discharge header and discharge line 156 to the suction or settling tank 110. The particulate separated by the centrifugal separator 152 is conducted by means of a disposal conduit 158 to a suitable disposal receptacle 160 for ultimate disposal in any suitable manner.

Depending upon the circumstances of the completion fluid treatment system, including the characteristics of the fluid involved, the quantity and size of particulate that is entrained in the washing fluid, a backwash recovery unit may be employed which may be connected in series with the centrifugal separator 152 or, in the alternative, may be utilized in lieu of the centrifugal separator. As shown in FIG. 4, there is provided a liquid settling tank 162 that is interconnected with the discharge conduit 154 of the centrifugal separator or, in the alternative, is adapted to be connected directly to the discharge conduit 148 of the filter system 142. The settling tank 162 may, if desired, be baffled, and the upper portion of the settling tank is established in communication with a backwash filter unit 164 that separates solids from the settled circulating fluid medium and discharges clean circulating fluid through conduit 154 to the suction tank 110.

Figure 5:
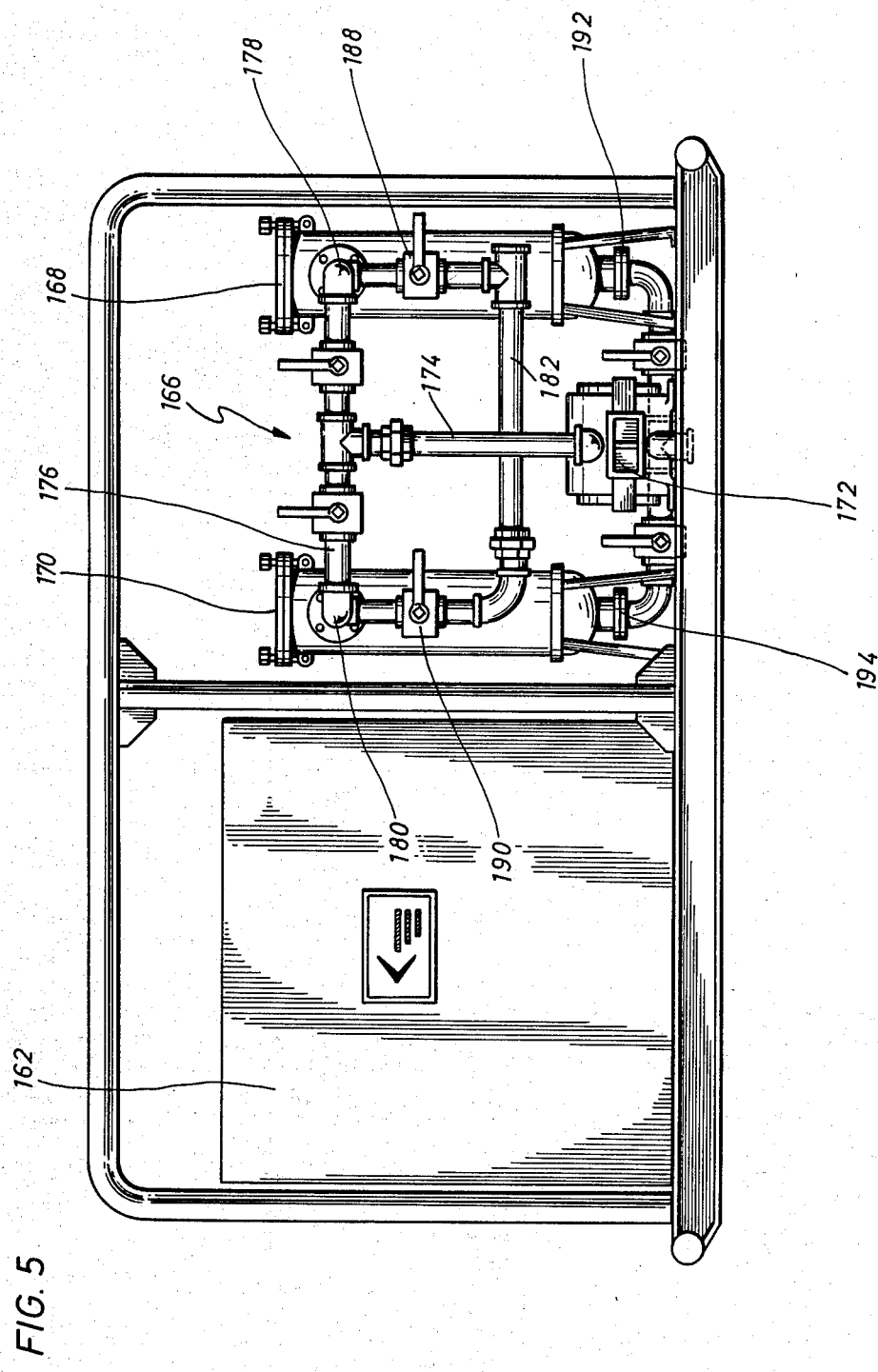
FIG. 5 is an elevational view of a backflush fluid recovery unit that is adapted to be utilized in the fluid processing systems of FIGS. 3 and 4.

Referring now to FIG. 5, the backwash recovery unit is illustrated generally at 166 and includes two or more basket type filters such as shown at 168 and 170 which include removable and reusable fabric filter baskets that function to separate solid particulate from the circulation fluid that is received from the settling tank 162. The filter mechanisms 168 and 170 may be of the type that can be obtained commercially from the Ronningen-Petter Division of the Dover Corporation of P.O. Box 188, Portage, Mich. 49081. Contaminated circulation fluid from the settling tank 162 is energized by means of a pump mechanism 172 and flows through a pump discharge conduit 174 to a manifold conduit 176 having fluid communication with the upper portion of each of the filter mechanisms 168 and 170 under the control of valves 178 and 180. Flow through a conduit 182 and branch conduits 184 and 186 is controlled by means of valves 188 and 190. Thus, the respective valves 178, 180, 188 and 190 may be positioned to allow pumping of circulating fluid simultaneously into the filter mechanisms 168 and 170 or, in the alternative, may be positioned to allow selective pumping of circulating fluid into only one or more of the filter mechanisms, isolating other filter mechanisms for the purpose of cleaning. With the valve elements positioned to isolate a particular filter mechanism, the isolated filter may be opened and the internal particulate selection basket thereof removed for dumping or other disposal of the particulate that has collected therein. The filter basket may then be reinstalled and the valves controlling the isolated filter may be repositioned to again place the filter in communication with the discharge conduit 174 pump. Cleaned circulating fluid will exit the various filters at bottom outlet conduits 192 and 194 thereof. The valving and piping arrangement illustrated in FIG. 5 is intended only for purpose of illustration, it being within the scope of this invention to employ other valving and conduit arrangements that accomplish the intended purpose. The basket type filter mechanisms are intended to be utilized simultaneously for solid separation from the circulation fluid. When cleaning is necessary, the filter mechanisms are selectively isolated from the fluid flow system for the purpose of removing collected particulate from the internal filters thereof. If desired, the filter baskets may simply be removed and replaced with clean baskets, which clean baskets may be subsequently stored for use, thereby limiting the amount of down time and allowing the individual filters to be placed back in service as soon as practical.

Figure 6:
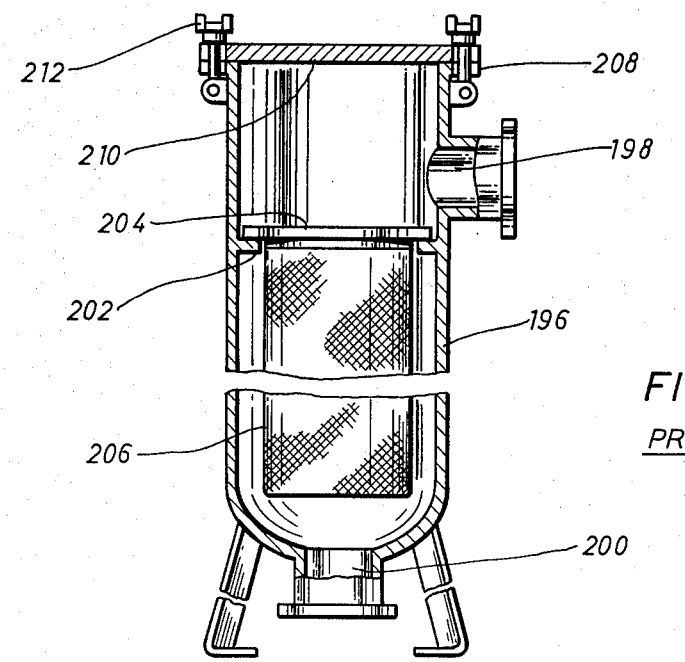
FIG. 6 is a sectional view of a basket type liquid filter unit which is employed in the backwash filter of FIG. 5.

Each of the filter mechanisms 168 and 170 may be constructed essentially as illustrated in FIG. 6 wherein a body structure 196 has a contaminated fluid inlet 198 at the upper extremity thereof and a clean fluid discharge conduit 200 at its lower extremity. Inside the body 96 is defined an annular support shoulder 202 that is positioned below the inlet conduit 198 and which is adapted to support an upper rigid portion 204 of a basket type filter 206 that is composed of a fabric material through which only the liquid medium is allowed to pass. Contaminated circulating fluid enters the filter housing 196 through the conduit 198 and flows into the open upper extremity of the filter basket 206. The particulate material that is entrained in the contamined circulating fluid is retained by the filter medium and clean liquid is allowed to pass through the filter to be discharged through the discharge conduit 200. Since it will be desirable from time to time to remove the basket type filter 206 for cleaning and/or replacement, the upper portion of the housing 96 is formed to define an access opening 208 that is closed by means of a closure plate 210 which is secured in place by means of a plurality of clamp elements 212.

As particulate-contaminated fluid is passed through the primary filter system shown at 12 in FIG. 3 and 142 in FIG. 4, the differential pressure across the filter membranes is maintained at such level that a degree of particulate compacting occurs. The small particulate, which ordinarily remains in suspension due to the minute particulate size thereof and is thus extremely slow to settle out of solution, becomes compacted by the pressure that is maintained by the pump and results in the development of a compacted filter cake. During backflushing of the primary filters, the compacted filter cake is broken up into many large size particles that will readily settle out of solution. By then transferring the backflushed fluid to settling tanks 76 and 150 prior to accomplishing centrifugal separation, a substantial quantity of the filter-separated particulate will immediately settle out of solution thus requiring only minimal centrifugal separation to accomplish sufficient cleaning of the backflushing fluid for reuse. Thus, it is important to ensure that backflushing of the primary filters occurs only after build-up of a dense and suficiently compacted filter cake to ensure development of particulate that will resist disintegration during transportation to the settling system that receives the same.

In view of the foregoing, it is readily apparent that the present invention provides a novel system and novel apparatus for accomplishing cleaning of continuously circulating liquid such as is typically employed in well completion and workover activities. The liquid cleaning system is quite flexible, allowing selective utilizatiion of a vibratory screen separator or bypassing the screen separator entirely in the event the characteristics of the contaminated circulating liquid do not require its use. The primary filter bank incorporated in conjunction with this invention is self-regenerating automatically in response to predetermined conditions. Each of the filters is automatically regenerated while continuous flow of the liquid circulation system is maintained by other ones of the filters incorporated within the filter bank. It is not necessary, therefore, to shut down the liquid circulation system in order to accomplish cleaning of the filters and the filters remain completely effective at all times due to automatic backwashing thereof.

It is therefore apparent that the present invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A method of filtering liquid employed in completion and workover of petroleum wells, said method comprising:

injecting clean liquid into the well bore in substantially continuous manner;

receiving a substantially continuous flow of contaminated liquid from said well bore;

forcing said contaminated liquid through a plurality of solids separator filters interconnected in parallel, series or compounded relation to common inlet, discharge and drain headers, said solids separator filters separating solid particulate above a predetermined size from said contaminated. liquid and resulting in discharge of clean liquid from said discharge header for reinjection into said well bore;

sequentially restoring each of said filters upon predetermined accumulation in said filters of solid particulate separated from said contaminated liquid by backflushing and discharging backflushed liquid and backflushed particulate to said drain header while maintaining a substantially continuous flow of said contaminated liquid through other ones of said plurality of solids separator filters wherein said backflushing is accomplished by diverting a portion of the flow of cleaned fluid flowing from other filters into said discharge header to the selected filter to be backflushed and causing reversal of the flow of liquid in the selected filter, which cleaned fluid flushes away accumulated particulate from said selected filter and transport said particulate into said drain header;

transporting fluid and particulate from said drain header to second solids separator means;

separating a majority of said particulate from said fluid and resulting in partially cleaned fluid;

transporting said separated majority of said particulate to a disposal receiver; and returning said partially cleaned fluid to said plurality of solid separator filters for filtering 2. A method as recited in claim 1, wherein:

said predetermined accumulation of solid particulate in said filters being detected by the development of a predetermined pressure differential across said filters.

3. A method as recited in claim 2, wherein:

selection and timing means accomplishes selection of filters for backflushing and accomplishes backflushing of said filters for a sufficient period of time to accomplish restoration of the filtering capability thereof.

4. A method as recited in claim 1, wherein said method includes:

subjecting said contaminated liquid to preliminary solids separation prior to filtering to separate large particulate therefrom.

5. A method as recited in claim 4, wherein:

said preliminary solids separation is accomplished by screening said contaminated liquid through vibratory screening apparatus.

6. A method as recited in claim 1, wherein:

forcing of said contaminated liquid through said filter is accomplished at sufficiently high pressure to ensure development of a filter cake of sufficiently dense character that break-up of said filter cake during backflushing develops large sized particulate, a substantial quantity of which will readily settle out of solution.

7. A method as recited in claim 6, including:

passing the backflushing liquid and filter cake particulate through settling vessel means to accomplish settling of said substantial quantity of filter cake particulate; and passing the backflushing liquid from said settling vessel means through centrifugal separator means to accomplish sufficient separation of filtered particulate therefrom to facilitate reuse of said backflushing liquid.

8. A method of cleaning continuously circulating liquid that becomes contaminated with solid particulate and debris during circulation, said method comprising:

receiving contaminated liquid and conducting said contaminated liquid through a preliminary separator for removal of large solid particulate and debris therefrom;

forcing the liquid discharge of said preliminary separator through filter means incorporating a plurality of solids separator filters that are interconnected with common inlet, discharge and drain headers with flow of liquid through said filters being controlled by valve means, said valve means being positionable at a filtering position allowing flow of contaminated liquid from said inlet header through said filters resulting in the flow of cleaned liquid into said discharge header, said valve means being positionable at a backflushing position allowing flow of clean liquid from the discharge header through said filters in reverse manner causing removal of accumulated solid particulate from said filters and liquid transportation of the removed particulate to said drain header;

sequentially restoring each of said plurality of filters upon predetermined accumulation in said filters of solid particulate separated from said contaminated liquid by positioning of said valve means at said backflushing position and backflushing said accumulation of solid particulate therefrom as set forth above;

transporting cleaned liquid from said discharge header to circulation means for recirculation;

transporting liquid and solid particulate from said drain header to secondary separator means for separation of a majority of said solid particulate from said liquid, resulting in a discharge of partially cleaned liquid and solid particulate waste from said secondary separator means;

disposing of said particulate waste; and passing said partially cleaned liquid discharge of said secondary separator means into said filter means for recirculation.

9. A method as recited in claim 8, wherein said primary mechanical separator comprises:

a vibratory screen mechanism causing screen separation of said large particulate and debris from said contaminated liquid.

10. A method as recited in claim 8, wherein said secondary separator means comprises:

a centrifugal separator having an inlet connected to said drain header, a clean liquid discharge communicating separated liquid to the discharge of said preliminary separator, and a separated solids discharge transporting separated solid particulate to disposal means.

11. A method as recited in claim 10, wherein:

said contaminated liquid is delivered to a first settling tank and is pumped from said first settling tank to said preliminary separator;

a clean tank receives the discharge of said preliminary separator and said centrifugal separator; and
pump means transports contaminated liquid from said clean tank to the inlet header under the force of pump induced pressure.

12. A method as recited in claim 8, wherein:
forcing of said contaminated liquid through said filter is accomplished at sufficiently high pressure to ensure development of a filter cake of sufficiently dense character that break-up of said filter cake during backflushing develops large sized particulate, a substantial quantity of which will readily settle out of solution.

13. A method as recited in claim 12, including:
passing the backflushing liquid and filter cake particulate through settling vessel means to accomplish settling of said substantial quantity of filter cake particulate; and
passing the backflushing liquid from said settling vessel means through centrifugal separator means to accomplish sufficient separation of filtered particulate therefrom to facilitate reuse of said backflushing liquid.

14. Apparatus for cleaning continuously circulating liquid that becomes contaminated with solid particulate and debris during circulation, said apparatus comprising:
a vibratory screen separator having an inlet receiving said contaminated liquid and separating large particulate and debris therefrom, said vibratory screen separator having a contaminated liquid discharge inlet, discharge and drain headers, said inlet header being interconnected with said contaminated liquid discharge;
a plurality of solid particulate separation filters being interconnected with said inlet, discharge and drain headers;
valve means for each of said filters and being positionable at a filtering position allowing flow of contaminated liquid from said inlet header through the respective filter and allowing the flow of clean liquid from the respective filter to said discharge header, said valve means being positionable at a backflushing position allowing flow of clean liquid from said discharge header through the respective filter in reverse manner causing removal of accumulated solid paticulate from said filter and liquid transportation of the removed solid particulate from the filter to said drain header;
control means for selecting a filter for backflushing, automatically shifting said valve means of said filter to said backflushing position responsive to a predetermined signal to cause backflushing restoration of the filtering capability thereof;
a centrifugal separator having an inlet connected to the drain header and being capable of separating a majority of the solid particulate from backwashing liquid received from said drain header, said centrifugal separator having a solid particulate discharge communicating with a disposal facility and a liquid discharge communicating said backflushing liquid to said inlet header; and
circulation pump means having suction means communicating with said discharge header and discharge means interconnected with said liquid circuit.

15. Apparatus as recited in claim 14, including:
first, second and third settling tanks;
connection means interconnecting said first, second and third settling tanks in series, said first settling tank receiving contaminated liquid;
valve means allowing selective series communication of said first, second and third settling tanks; and
said inlet of said vibratory screen separator receiving contaminated liquid from said first settling tank.

16. Apparatus as recited in claim 15, including:
an intermediate tank receiving the discharge of said vibratory screen separator and having an outlet interconnected with said inlet header.

17. Apparatus for cleaning continuously circulating liquid in a well completion system, wherein the liquid becomes contaminated with solid particulate and debris during circulation, said apparatus comprising:
a suction tank for holding a quantity of clean circulation liquid;
pump means having a suction line in communication with said suction tank and a discharge line supplying liquid under pressure for circulation;
a vibratory screen separator having an inlet receiving said contaminated liquid from said well completion system and separating large particulate and debris therefrom, said vibratory screen separator having a contaminated liquid inlet, a particulate discharge and a liquid discharge;
inlet discharge and drain headers, said inlet header being interconnected with said liquid discharge;
a plurality of solid particulate separation filters being interconnected with said inlet, discharge and drain headers;
valve means for each of said filters and being positionable at a filtering position allowing flow of contaminated liquid from said inlet header through the respective filter and allowing the flow of clean liquid from the respective filter to said discharge header, said valve means being positionable at a backflushing position allowing flow of clean liquid from said discharge header through the respective filter in reverse manner causing removal of accumulated solid particulate from said filter and liquid transportation of the removed solid particulate from the filter to said drain header;
control means for selecting a filter for backflushing, automatically shifting said valve means of said filter to said backflushing position responsive to a predetermined signal to cause backflushing restoration of the filtering capability thereof; and
a backflushed liquid separator having an inlet connected to the drain header and being capable of separating a majority of the solid particulate from backflushing liquid received from said drain header, said backflushed liquid separator having a solid particulate discharge communicating with a disposal facility and a clean liquid discharge communicating cleaned backflushing liquid to said suction tank.

18. Apparatus as recited in claim 17, wherein said backflushed liquid separator comprises:
a plurality of basket type solid separators for separating solid particulate from said liquid; and
valve means for simultaneously communicating said solid separators with said drain header, said valve means being positionable to isolate selected ones of said basket type solid separators for cleaning while maintaining flow of liquid from said drain conduit through remaining ones of said solid separators.

19. Apparatus as recited in claim 18, wherein:

centrifugal separator means is interconnected in series with said basket type solid separators and functions to separate solid particulate from said liquid prior, said centrifugal separator means defining inlet means connected to said drain header and clean liquid discharge means connected to the inlet of said basket type solid separators.

* * * * *